(12) United States Patent
Kreienkamp et al.

(10) Patent No.: US 11,959,388 B2
(45) Date of Patent: Apr. 16, 2024

(54) TURBOCHARGER HAVING IMPROVED SHAFT SEAL

(71) Applicant: Turbo Systems Switzerland Ltd, Baden (CH)

(72) Inventors: Christian Kreienkamp, Bad Säckingen (DE); Florian Maurer, Zürich (CH)

(73) Assignee: Turbo Systems Switzerland Ltd, Baden (CH)

( * ) Notice: Subject to any disclaimer, the term of this patent is extended or adjusted under 35 U.S.C. 154(b) by 7 days.

(21) Appl. No.: 17/286,476

(22) PCT Filed: Oct. 17, 2019

(86) PCT No.: PCT/EP2019/078178
§ 371 (c)(1),
(2) Date: Apr. 18, 2021

(87) PCT Pub. No.: WO2020/079128
PCT Pub. Date: Apr. 23, 2020

(65) Prior Publication Data
US 2021/0348524 A1 Nov. 11, 2021

(30) Foreign Application Priority Data
Oct. 18, 2018 (EP) ..................................... 18201214

(51) Int. Cl.
*F01D 25/18* (2006.01)
*F02C 6/12* (2006.01)
(52) U.S. Cl.
CPC .............. *F01D 25/186* (2013.01); *F02C 6/12* (2013.01); *F05D 2220/40* (2013.01); *F05D 2240/55* (2013.01); *F05D 2260/98* (2013.01)
(58) Field of Classification Search
CPC ...... F01D 25/18; F01D 25/183; F01D 25/186; F01D 25/16; F02C 6/12; F05D 2220/40;
(Continued)

(56) References Cited

U.S. PATENT DOCUMENTS 4,268,229 A 5/1981 Berg
4,664,605 A * 5/1987 Asano .................. F04D 29/106
417/407
(Continued)

FOREIGN PATENT DOCUMENTS

DE 102007027869 A1 12/2008
DE 102013005167 B3 9/2014
(Continued)

OTHER PUBLICATIONS

European Patent Office, International Search Report for PCT/EP2019/078178, dated Jan. 16, 2020, 6 pages (including appended translation).

(Continued)

*Primary Examiner* — Loren C Edwards
(74) *Attorney, Agent, or Firm* — Armstrong Teasdale LLP (57) ABSTRACT

The invention relates to a turbocharger which contains a bearing device which is arranged between a compressor and a turbine and which is designed to support a shaft. This bearing device has a bearing housing, in which an oil-lubricated bearing for supporting the shaft is arranged. The shaft has a slinger element extending in the circumferential direction for centrifugally dispersing lubricating oil. The bearing housing has an oil drainage channel for discharging the lubricating oil from the bearing housing. The inner region of the bearing housing forms an oil delimitation chamber, which is sealed off by seals arranged between the shaft and the bearing housing. The oil delimitation chamber has a deflection means which is formed in such a way that, during operation of the turbocharger, lubricating oil that is centrifugally dispersed by the slinger element is deflected by the deflection means and is conducted in the opposite direction to the seals. The oil delimitation chamber is formed in the vicinity of the slinger element in such a way that the lubricating oil centrifugally dispersed by the slinger element (Continued)

during operation of the turbocharger can be transferred directly from said slinger element to the deflection means. A collection channel prevents lubricating oil centrifugally dispersed from the slinger element from flowing back into the seal region. The slinger element is formed in such a way that the lubricating oil sprayed away from the slinger element has a radial and an axial directional component, and the axial directional component runs in the opposite direction to the seals.

21 Claims, 4 Drawing Sheets

(58) Field of Classification Search
CPC .............. F05D 2240/55; F05D 2260/98; F05D 2260/609
See application file for complete search history.

(56) References Cited

U.S. PATENT DOCUMENTS

| | | |
|---|---|---|
| 9,988,976 B2 | 6/2018 | Kocher |
| 2004/0057847 A1 | 3/2004 | Wild |
| 2010/0192571 A1 | 8/2010 | Boning et al. |
| 2010/0196140 A1* | 8/2010 | Gee .......................... F16C 33/10 |
| | | 415/111 |
| 2015/0337721 A1* | 11/2015 | Kocher ................. F01D 25/002 |
| | | 415/111 |
| 2016/0265426 A1 | 9/2016 | Annati |
| 2018/0238227 A1 | 8/2018 | Wood et al. |

FOREIGN PATENT DOCUMENTS

| | | |
|---|---|---|
| DE | 102015014613 A1 | 7/2016 |
| EP | 3363997 A1 | 8/2018 |
| JP | H05-065829 A | 3/1993 |
| JP | H09-310620 A | 12/1997 |
| JP | 2004068820 A | 3/2004 |
| JP | 2008240522 A | 10/2008 |
| JP | 2013002429 A | 1/2013 |
| WO | 2010135135 A2 | 11/2010 |
| WO | 2017026292 A1 | 6/2018 |

OTHER PUBLICATIONS

European Patent Office, Written Opinion for PCT/EP2019/078178, dated Jan. 16, 2020, 15 pages (including appended translation).
Chinese Office Action dated Apr. 22, 2023, in related Chinese Application No. 201980068385.6, 6 pages.

* cited by examiner

TURBOCHARGER HAVING IMPROVED SHAFT SEAL

CROSS-REFERENCE TO RELATED APPLICATIONS

This application is a national stage entry under 35 U.S.C. § 371 of PCT International Application No. PCT/EP2019/078178, filed Oct. 17, 2019, which claims priority to European Patent Application No. 18201214.6, filed Oct. 18, 2018. The entire disclosures of the foregoing applications are incorporated herein by reference.

TECHNICAL FIELD OF THE INVENTION

The invention relates to a turbocharger having an improved shaft seal.

PRIOR ART

Turbochargers are fitted with shaft seals which are made up of two elements in most cases. One of these elements is an oil seal which is provided to seal the inner region of the bearing housing of the respective turbocharger against an outward oil leak. An oil seal of this kind may be designed in the form of a labyrinth seal. The other element is a gas seal which is provided to seal the inner region of the bearing housing against gas ingress from outside. A gas seal of this kind may be designed in the form of a piston ring seal, for example.

For turbochargers with axial turbines, labyrinth throttle seals combined with sealing air are frequently also used as the gas seal, in order to prevent hot gas from entering the bearing housing from the turbine side. The necessary oil seal is frequently configured as a collection chamber labyrinth.

Piston ring seals without sealing air are frequently used as the gas seal for turbochargers with radial turbines due to space, complexity/cost and performance considerations.

SUMMARY OF THE INVENTION

The problem addressed by the invention is that of specifying a turbocharger that has an improved shaft seal.

This problem is solved by a turbocharger having the features specified in claim 1. This turbocharger contains a bearing device which is arranged between a compressor and a turbine and which is designed to support a shaft, said bearing device having a bearing housing in which an oil-lubricated bearing for supporting the shaft is arranged, wherein the shaft has a slinger element extending in the circumferential direction for centrifugally dispersing lubricating oil, wherein the bearing housing has an oil drainage channel for discharging the lubricating oil from the bearing housing, wherein the inner region of the bearing housing forms an oil delimitation chamber which is sealed off by seals arranged between the shaft and the bearing housing, wherein the oil delimitation chamber has a deflection means which is formed in such a manner that, during operation of the turbocharger, lubricating oil that is centrifugally dispersed by the slinger element is deflected by the deflection means and is conducted in the opposite direction to the seals, and wherein the oil delimitation chamber is formed in the vicinity of the slinger element in such a manner that the lubricating oil centrifugally dispersed by the slinger element during operation of the turbocharger can be transferred straight from said slinger element to the deflection means, wherein the slinger element is formed in such a manner that the lubricating oil sprayed away from the slinger element has a radial and an axial directional component, wherein the axial directional component runs in the opposite direction to the seals.

According to an embodiment of the invention, the oil delimitation chamber is delimited towards the shaft in a portion of the shaft arranged axially alongside the slinger element by a bearing flange connected to the bearing housing. According to an embodiment, the oil delimitation chamber may have a collection channel for intercepting the lubricating oil received from the deflection means. The collection channel may be configured as part of the bearing flange, for example. The collection channel may have at least one wall element to prevent the lubricating oil diverted by the deflection means from running back in the direction of the seals. The wall element may, in particular, be arranged at an end of the bearing flange facing the turbine or the seals. The collection channel may be formed in such a manner that it conducts lubricating oil from the collection channel into the oil drainage channel when the turbocharger is operating.

According to an embodiment, the bearing flange is designed as part of a bearing module inserted in the bearing housing such that it can be removed, wherein the bearing module has a bearing for the shaft. According to an embodiment, the bearing flange is arranged along an axial portion circumferentially about the shaft.

According to an embodiment, the bearing flange delimits at least part of the oil delimitation chamber. In particular, a radially internal delimitation of the oil delimitation chamber may be formed at least in part by the bearing flange. More than 50%, or even more than 75%, of the axial extent of the radially internal delimitation of the oil delimitation chamber is preferably formed by the bearing flange (where necessary including the collection channel). The radially outer delimitation of the oil delimitation chamber may be formed by the bearing housing and, in particular, comprise the deflection means, e.g. as an oblique wall portion of the bearing housing.

According to an embodiment of the invention, the deflection means is an integrated constituent of the wall of the bearing housing.

According to an embodiment of the invention, the deflection means is a ring inserted in the oil delimitation chamber.

According to an embodiment of the invention, the deflection means has a cone-shaped design.

According to an embodiment of the invention, the deflection means has an arc-shaped design.

According to an embodiment of the invention, the deflection means is arranged at least in part above the shaft (in other words overlapping the half-space which lies above the horizontal plane containing the turbocharger axis) and may, in particular, be arranged above the shaft in the vertical sectional plane containing the turbocharger axis.

According to an embodiment of the invention, the slinger element is a shaft shoulder.

According to an embodiment of the invention, the slinger element is a free-standing slinger disk.

According to an embodiment of the invention, the cross section of the oil delimitation chamber is enlarged in the region between the slinger element and the deflection means as the distance from the shaft increases.

According to an embodiment of the invention, the cross section of the oil delimitation chamber is enlarged incrementally in the region between the slinger element and the deflection means as the distance from the shaft increases.

According to an embodiment of the invention, the enlargement of the cross section of the oil delimitation chamber in the region between the slinger element and the deflection means is formed at least in part by a recess in the bearing flange.

According to an embodiment of the invention, the oil drainage channel is cylindrical in design in the region of an oil drainage opening in the bearing housing and has, between this cylindrically formed region and the shaft, an oil drainage ramp running obliquely in the direction of the shaft, through which the oil drainage channel is widened in the direction of the shaft.

According to an embodiment of the invention, in a first ramp region adjacent to the cylindrically configured region, the oil drainage ramp forms a first angle relative to the shaft which falls in the range between 45° and 80°.

According to an embodiment of the invention, in a second ramp region adjacent to the first ramp region, the oil drainage ramp forms a second angle relative to the shaft which falls in the range between 30° and 45°.

According to an embodiment of the invention, the turbocharger has a screen which is arranged to shield the seals from lubricating oil spray in a region below the shaft.

According to an embodiment of the invention, the following equation applies to the diameter of the cylindrically formed region of the oil drainage channel relative to the diameter of the shaft of the turbocharger:

$$F/D > 0.7,$$

where F is the diameter of the cylindrically configured region of the oil drainage channel and D is the diameter of the turbocharger shaft.

The following equation applies according to an embodiment of the invention:

$$(A+C)/D > 2.7,$$

where A is the distance of the end of the oil drainage ramp remote from the oil drainage opening from the shaft, C is the distance of the end of the oil drainage ramp closer to the oil drainage opening from the shaft, and D is the diameter of the shaft.

The following equation applies according to an embodiment of the invention:

$$G/H < 1,$$

where G is a screen of a trapped oil damper gap and H is the outer diameter of a radial bearing of the turbocharger, The following equation applies according to an embodiment of the invention:

$$H/D < 1,$$

where H is the outer diameter of a radial bearing of the turbocharger and D is the diameter of the shaft.

The following equation applies according to an embodiment of the invention:

$$B/D > 0.2,$$

where B is the height of a collection chamber and D is the diameter of the shaft.

The following equation applies according to an embodiment of the invention:

$$X/Z < 1,$$

where X is the angle between the shaft and the deflection cone and Z is the slinger angle of the lubricating oil from the shaft in the direction of the deflection cone.

The following equation applies according to an embodiment of the invention:

$$(J+\sin(X) \cdot E)/D > 0.5,$$

where J is the distance of the end of the deflection cone close to the shaft, X is the angle between the shaft and the deflection cone, E is the axial length of the deflection cone, and D is the diameter of the shaft.

The features described above serve to relieve pressure on the seals of the bearing housing, as they increase the housing volume available below the shaft for an oil discharge from the bearing housing and bring about a defined transportation or a selective deflection of the lubricating oil sprayed away from the shaft during operation of the turbocharger away from the seals of the bearing housing. In addition, lubricating oil that has already been thrown away is prevented from being able to flow back into the seal region.

BRIEF DESCRIPTION OF THE DRAWINGS

The invention is described below with the help of exemplary embodiments which are explained in greater detail with the help of the drawings. In the drawings.

DETAILED DESCRIPTION OF THE DRAWINGS

Figure 1:
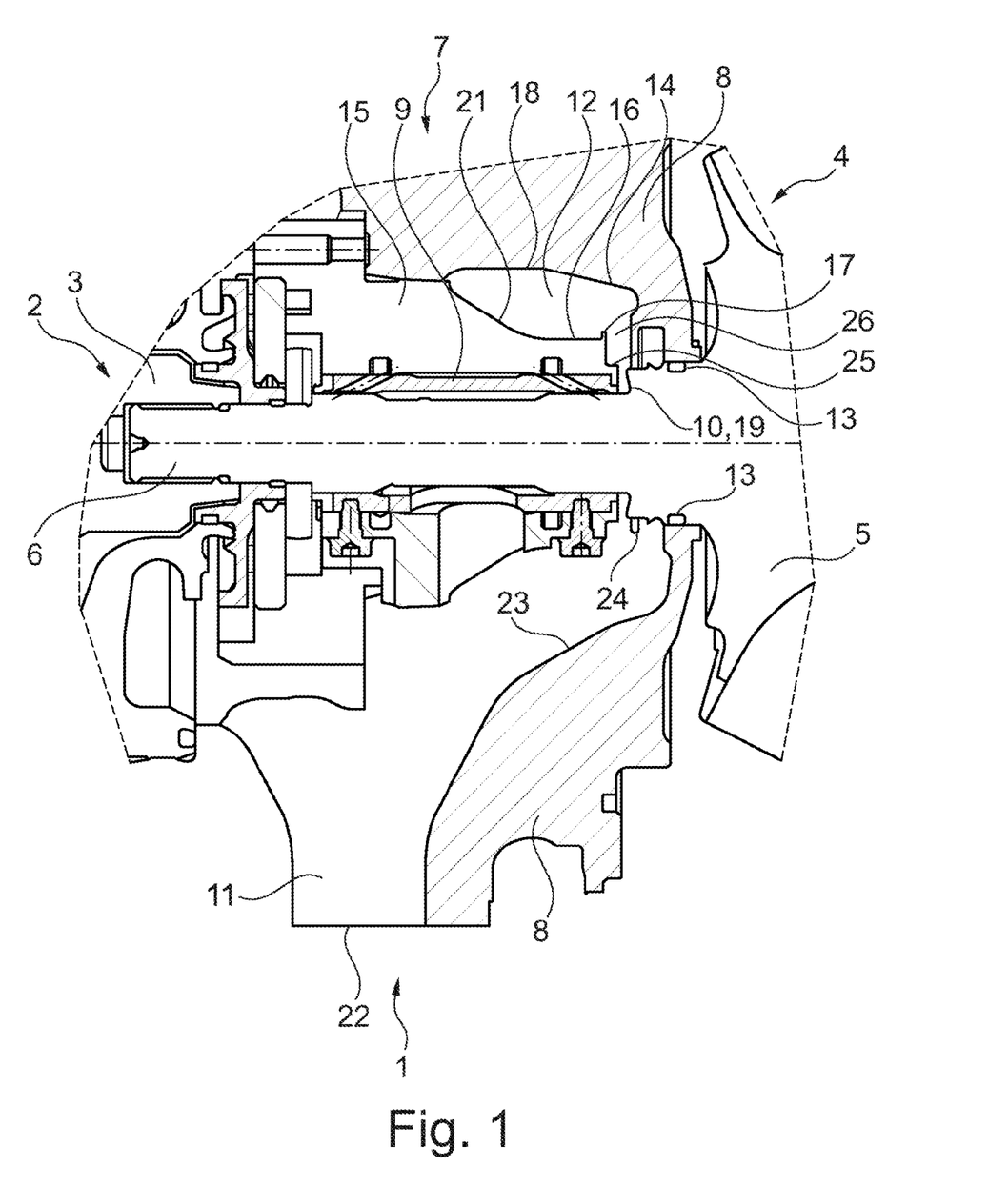
FIG. 1 shows a cross-sectional representation of a partial region of a turbocharger in which the components of the turbocharger according to the invention are arranged.

FIG. 1 shows a cross-sectional representation of a partial region of a turbocharger in which the components of the turbochargers according to the invention are arranged. This turbocharger 1 contains a bearing device 7 which is arranged between a compressor 2 and a turbine 4 and is designed to support a shaft 6. This bearing device 7 has a bearing housing 8 in which an oil-lubricated bearing 9 for supporting the shaft is arranged. In the exemplary embodiment shown, this bearing 9 is a radial bearing. The compressor 2 has a compressor wheel 3 which is fixedly connected to the shaft 6. The turbine 4 includes a turbine wheel 5 which is fixedly connected to the shaft 6.

The shaft 6 has a slinger element 10 which is a shaft shoulder 19 in the exemplary embodiment shown. This shaft shoulder 19 is a step in the shaft 6 by means of which the shaft diameter is enlarged at this point.

During operation of the turbocharger 1, lubricating oil which is centrifugally dispersed radially outwardly at the slinger element 10 and also centrifugally dispersed slightly axially in the direction of the bearing housing center due to the shape of the shaft shoulder is conveyed through a gap between the radial bearing 9 and the shaft 6. This centrifugally dispersed lubricating oil is conveyed into an oil delimitation chamber 12 which is formed in the inner region of the bearing housing 8. The oil delimitation chamber 12 is configured in the area surrounding the slinger element 10 in which the oil delimitation chamber 12 forms a spray channel 26 in such a manner that the lubricating oil centrifugally dispersed by the slinger element 10 during operation of the turbocharger 1 is transferred straight from the slinger element 10 to a deflection means 14. In this case, the cross section of the oil delimitation channel 12 is enlarged in the region between the slinger element 10 and the deflection means 14, i.e. in the spray channel 26, as the distance from the shaft 6 increases.

In the exemplary embodiment shown in FIG. 1, a step 25 is provided in this spray channel 26, so that the cross section of the spray channel in the region between the slinger element 10 and the deflection means 14 is enlarged incrementally as the distance from the shaft 6 increases. As an alternative to the exemplary embodiment shown in FIG. 1, the cross section of the spray channel 26 in the region between the slinger element 10 and the deflection means 14 may also be enlarged incrementally as the distance from the shaft 6 increases using multiple steps or also continuously without steps.

The step 25 shown in FIG. 1 is introduced in a bearing flange 15 which is fixedly connected to the bearing housing 8 of the turbocharger 1 or is a constituent part of the bearing housing 8, so that the enlargement of the cross section of the oil delimitation chamber 12 in the region between the slinger element 10 and the deflection means 14 is partially formed by a recess 21 in the bearing flange 15. Since—as can be seen from FIG. 1—the wall opposite the bearing flange 15 in the spray channel 26, which wall is likewise a constituent of the bearing housing 8, runs in a largely straight line in the radial direction, the aforementioned widening of the spray channel 26 is asymmetric. One advantage of this kind of asymmetric widening of the spray channel 26 is that the turbocharger 1 can be structurally compact in design. Accordingly, the centrifugally dispersed lubricating oil not only has a radial, but also an axial, directional component which is defined by the shape of the slinger element.

Figure 1A:
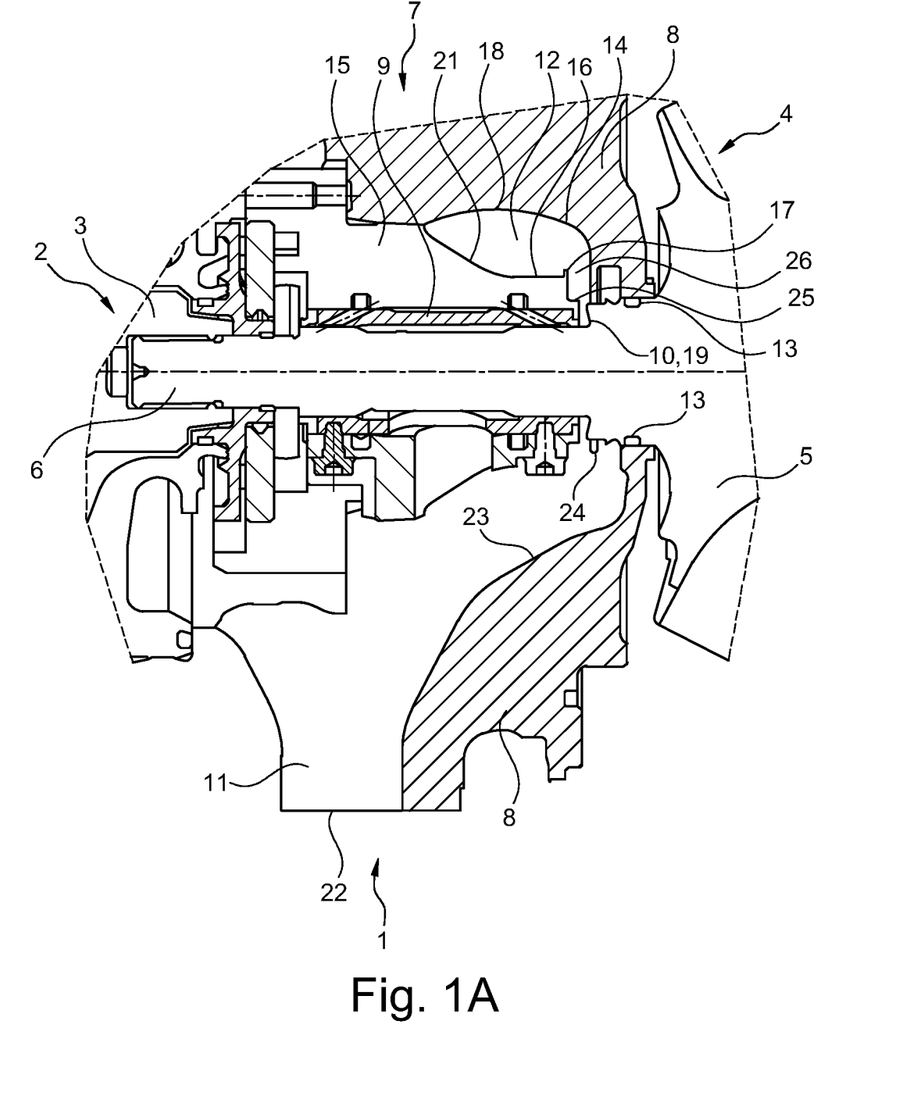
FIG. 1A shows a cross-sectional representation of a partial region of another example turbocharger.

The lubricating oil centrifugally dispersed by the slinger element 10 is deflected by the deflection means 14 and conducted in a direction opposite the seals 13 and 24, wherein the seal 13 is a piston ring provided for gas sealing and the seal 24 is a wall acting as an oil seal. In order to achieve this, the deflection means 14 has a cone-shaped design in FIG. 1. One alternative is for the deflection means 14 to have an arc-shaped design (see FIG. 1A). A further alternative is for the deflection means 14 not to be an integrated constituent of the bearing housing wall 18 as depicted in FIG. 1 and therefore not realized by the shape of the bearing housing wall, but to be in the shape of a ring inserted in the oil delimitation chamber 12. The internal surface of this ring oriented in the direction of the slinger element 10 may likewise be arc-shaped or cone-shaped in design, so that the lubricating oil centrifugally dispersed by the slinger element 10 during operation of the turbocharger 1 is deflected by the ring and as required conducted in the opposite direction to the seals.

Figure 3:
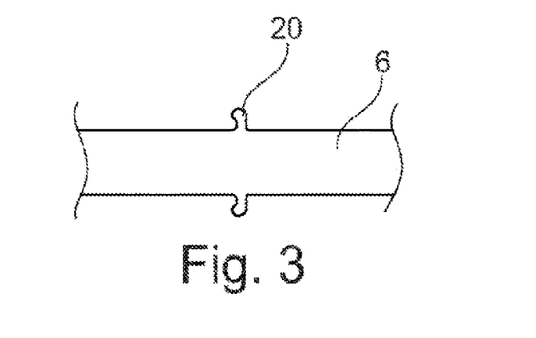
FIG. 3 shows a sketch to illustrate a projecting slinger disk provided on a shaft.

The slinger element 10 in FIG. 1 is a wave shoulder 19. An alternative embodiment involves the slinger element being realized as a free-standing slinger disk 20, as illustrated in FIG. 3. This free-standing slinger disk is likewise provided on the shaft 6. The shaft 6 preferably has the same diameter in an axial direction before and after the slinger disk 20.

Following deflection by the deflection means 14, the lubricating oil deflected by the deflection means 14 and conducted in an opposite direction to the seals runs along on the upper bearing housing wall 18, for the most part via the periphery of the oil delimitation chamber to the oil outlet, in part via the periphery of the bearing flange to the oil outlet, and in a small proportion to the end of the bearing flange, into a collection channel 16 formed in the bearing flange 15, the end region of said collection channel on the seal side being formed by a wall element 17 which prevents the lubricating oil collected in the collection channel 16 from flowing back into the spray channel 26.

By deflecting the lubricating oil sprayed by the slinger element 10 straight onto the deflection means 14 in an opposite direction to the seals and preventing the deflected lubricating oil from flowing back into the spray channel 26, it is advantageously achieved that no lubricating oil backup occurs in the spray channel 26, i.e. that the lubricating oil centrifugally dispersed by the slinger element 10 is not impeded by lubricating oil flowing back into the spray channel 26.

The lubricating oil collected in the collection channel 16 runs off through an oil drainage channel 11 arranged below the shaft 6. This channel extends as far as an oil drainage opening 22 in the bearing housing 8, through which the lubricating oil flowing off through the oil drainage channel 11 is conducted out of the bearing housing 8. The oil drainage channel 11 has a cylindrical design in the region of the oil drainage opening 22 in the bearing housing 8 and has, between this cylindrically formed region and the shaft 6, an oil drainage ramp 23 running obliquely in the direction of the shaft 6, through which the oil drainage channel 11 is widened in the direction of the shaft 6. This has the advantage that the outflow of the lubricating oil flow running off in the direction of the oil drainage opening 22 is made easier and that the lubricating oil receiving capacity of the oil drainage channel 11 is large, so that the probability of a lubricating oil backup extending into the region of the seal 13 is reduced.

Figure 2:
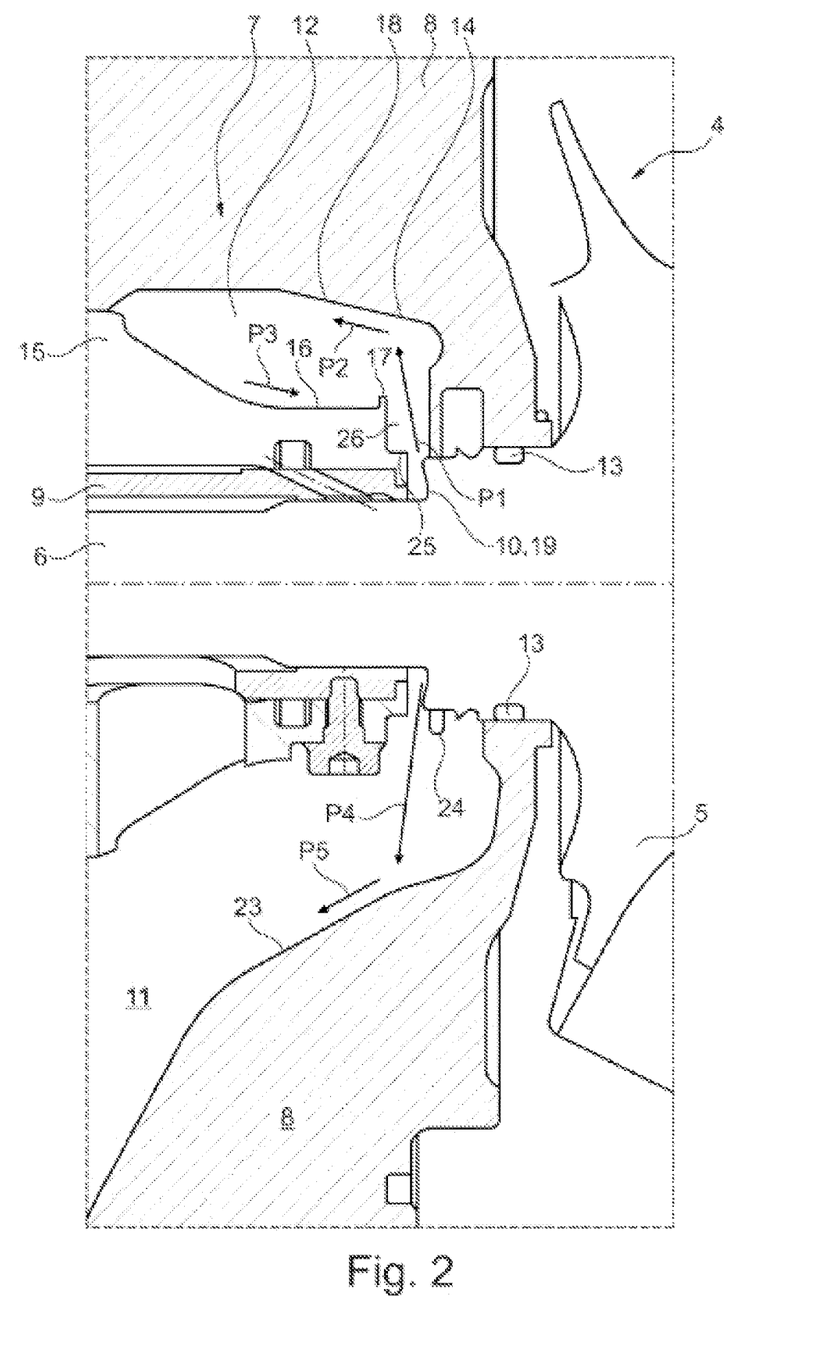
FIG. 2 shows an enlarged representation of a partial region of FIG. 1.

FIG. 2 shows an enlarged representation of a partial region of FIG. 1. In this representation the transport path of the lubricating oil emerging from the gap between the radial bearing 9 and the shaft 6 is depicted by arrows P1-P5. The lubricating oil emerging from the gap between the radial bearing 9 and the shaft 6 is dispersed centrifugally outwards in a radial direction at the slinger element 10, as depicted by the arrow P1, and directly encounters the deflection means 14 which is a cone-shaped constituent of the bearing housing 8 in the exemplary embodiment shown. The lubricating oil is deflected at this deflection means 14 and conducted in the oil delimitation chamber 12 in the direction opposite the seals 13, 24, as illustrated by arrow P2. The lubricating oil deflected in this way flows for the most part via the periphery of the bearing housing interior and bearing flange to the oil drain. The remaining portion is collected in the collection channel 16, as depicted by arrow P3. This collection channel 16 has a wall element 17 on its side facing the seals which prevents the lubricating oil collected in the collection channel 16 from being able to flow back into the spray channel 26. It is thereby ensured that the lubricating oil centrifugally dispersed by the slinger element 10 through the spray channel 26 in the direction of arrow P1 straight to the deflection means 14 is not impeded by lubricating oil flowing back into the spray channel 26 and there is no backup of lubricating oil in the spray channel 26. Lubricating oil centrifugally dispersed downwards from the shaft is conducted straight to the drainage ramp 23, as illustrated by arrow P4, runs off along this—as illustrated by arrow P5—downwardly in the direction of the oil drainage opening 22 in the bearing housing 8 and is discharged from the bearing housing 8 through said oil drainage opening 22. The probability of lubricating oil conducted into the oil drainage channel 11 reaching the region of the gas seal 13 is minimized by the oil seal 24.

FIG. 3 shows a sketch intended to illustrate a free-standing slinger disk 20 provided on a shaft 6 which can be used as the slinger element 10 as an alternative to the shaft shoulder 19. The shaft 6 has the same diameter in the axial direction before and after this slinger lug.

Figure 4:
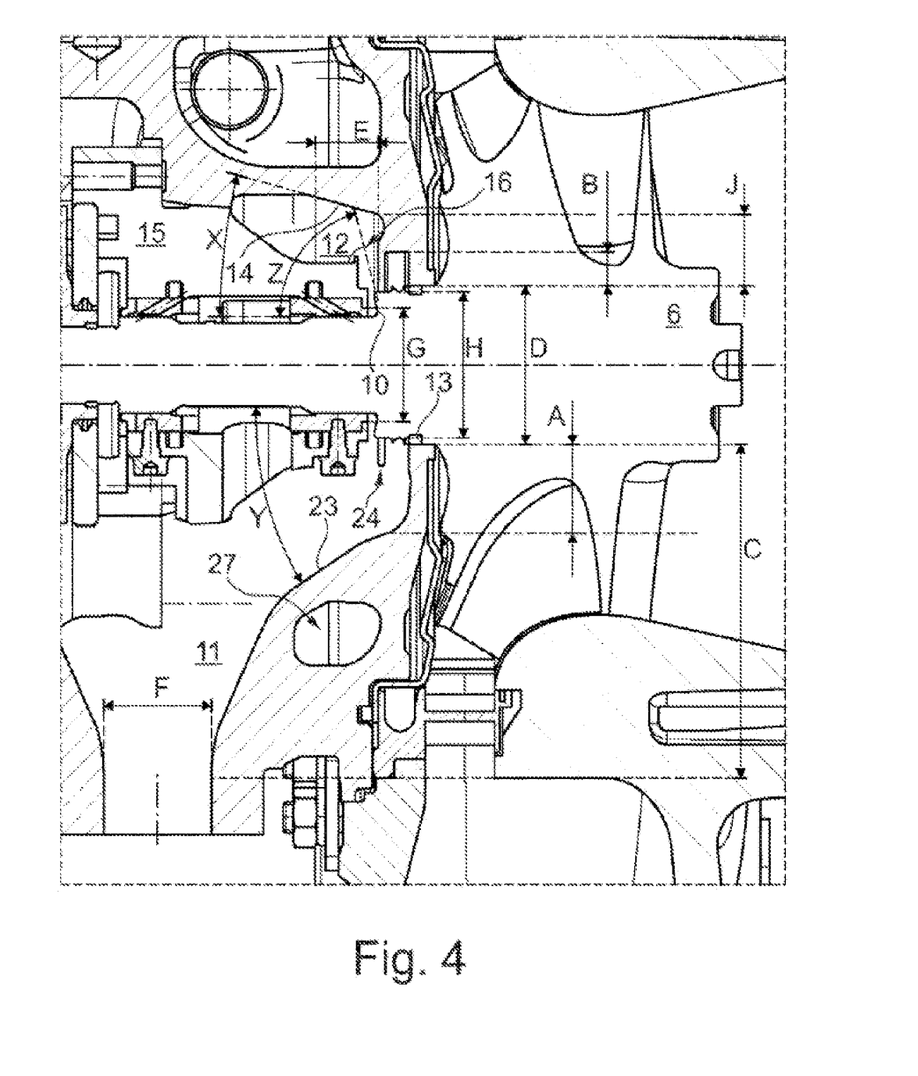
FIG. 4 shows a further cross-sectional representation of a partial region of a turbocharger in which the components of the turbocharger according to the invention are arranged.

FIG. 4 shows a further cross-sectional depiction of a partial region of a turbocharger in which the components of the turbocharger according to the invention are arranged.

The invention already described above provides a shaft seal which exhibits a substantially improved robustness in respect of oil leaks by utilizing given degrees of design freedom by comparison with shaft seals known in the art. A particular advantage of a shaft seal according to the invention is a substantially improved transportation of oil away from the turbocharger, a greatly increased housing volume below the shaft seal, and defined transportation or a selective deflection of the lubricating oil sprayed from the shaft away from the region in which the seals are arranged.

The other cross-sectional representation shown in FIG. 4 illustrates parameters by means of which the aforementioned advantages of the invention can be achieved.

In FIG. 4 the parameter F denotes the cross-sectional area of the oil drainage channel in the region of the oil drainage opening, wherein the oil drainage channel has a cylindrical design in this region. A first ramp region adjoins this cylindrically configured region of the oil drainage channel in the direction of the shaft 6, which ramp region forms a first angle relative to the shaft which falls in the range between 45° and 80°. Consequently, this region of the oil drainage ramp 23 has a steep profile. The steepness of the oil drainage ramp 23 in this region is caused by the positioning of a water channel 27 provided for cooling purposes in the bearing housing, among other things.

A slightly flatter region of the oil drainage ramp 23 adjoins this steep region of the oil drainage ramp 23 in the direction of the shaft 6. This slightly flatter region forms an angle relative to the shaft 6 which falls in the range between 30° and 45°. The parameter Y shown in FIG. 4 symbolizes the steepness of the oil drainage ramp 23 in the respective region.

The parameter A shown in FIG. 4 is the distance between the shaft 6 and the nearest point to the shaft on the drainage ramp 23.

The parameter C shown in FIG. 4 is the distance between the shaft 6 and the point on the drainage ramp 23 furthest away from the shaft 6. This point forms the interface between the drainage ramp 23 and the cylindrically formed region of the oil drainage channel 11.

The parameters F, Y, A and C referred to above are conducive to an improved, in particular accelerated, drainage of the lubricating oil and also an enlarged housing volume below the shaft, so that as much lubricating oil as possible can be received during operation without the level thereof rising up to the shaft 6.

The parameter Z denotes the spray angle of the lubricating oil at which the lubricating oil is sprayed freely by the slinger element 10 in the direction of the deflection means 14 from the region of the shaft 6. It is also evident from FIG. 4 that both the slinger element 10 and the deflection means 14 are formed in such a manner that sprayed lubricating oil is not sprayed or conducted axially in the direction of the seals, but axially in the opposite direction from the seals. The spraying angle should be kept as small as possible, so that the lubricating oil that is sprayed away can be conveyed as far away from the seals as possible.

The parameters X and E define a spray cone in the bearing housing, in order to deflect lubricating oil sprayed from the region of the shaft 6 in the spray angle Z and convey it backwards into the bearing housing in the opposite direction from the seals. For this purpose, the spray angle Z, the angle of the cone X, and the length E of the deflection cone and also the surrounding geometry must be configured in such a manner that the lubricating oil can be freely sprayed from the region of the shaft 6 to the deflection cone.

The parameter J denotes the distance of the shaft 6 from the point on the deflection cone nearest to the shaft. This distance should be as great as possible, so that the lubricating oil which is atomized after encountering the deflection cone is located as far away from the seals as possible.

Furthermore, the collection channel 16 through which lubricating oil conveyed away from the deflection cone 14 is prevented from running back into the seal region is illustrated in FIG. 4.

In addition, a seal 24 which acts as a screen and shields the region of the gas seal 13 in an area below the shaft 6 from spray oil is shown in FIG. 4.

Parameter G illustrates a screen of the trapped oil damper gap of the radial bearing, wherein G is selected to be smaller than the outer diameter H of the radial bearing. In this way, a direct injection of the shaft seal radial gap with lubricating oil from the radial bearing outer lubricating gap is prevented.

Parameter B denotes a collection chamber. Said collection chamber should have the largest possible dimensions but be limited to a size that is smaller than D/2—where D is the diameter of the shaft 6—for production reasons.

Furthermore, jumps in diameter are illustrated in FIG. 4. Parameter G is substantially selected to be substantially smaller than parameter H, in order to reduce any direct injection of the radial gap at H with lubricating oil from the radial gap at G. D is in turn selected to be larger than H, so that the lubricating oil is presented with a further obstacle due to an increase in diameter and so that D can act as a spray edge on the outlet side on the shaft into the upstream collection chamber B.

The following equations advantageously apply:

$F/D > 0.7$, where F is the diameter of the cylindrically configured region of the oil drainage channel 23 and D is the diameter of the shaft 6;

$(A+C)/D > 2.7$, where A is the distance of the end of the oil drainage ramp remote from the oil drainage opening from the shaft 6, C is the distance of the end of the oil drainage ramp 23 closer to the oil drainage opening from the shaft 6, and D is the diameter of the shaft, $G/H < 1$, where G is a screen of the trapped oil damper gap and H is the outer diameter of the radial bearing, $H/D < 1$, where H is the outer diameter of the radial bearing and D is the diameter of the shaft, $B/D > 0.2$, where B is the height of a collection chamber and D is the diameter of the shaft 6, $X/Z < 1$, where X is the angle between the shaft 6 and the deflection cone and Z is the spray angle of the lubricating oil from the shaft in the direction of the deflection cone, and $(J + \sin(X) \cdot E)/D > 0.5$, where J is the distance of the end of the deflection cone close to the shaft, X is the angle between the shaft and the deflection cone, E is the axial length of the deflection cone, and D is the diameter of the shaft.

LIST OF REFERENCE NUMBERS

1 Turbocharger
2 Compressor
3 Compressor wheel
4 Turbine
5 Turbine wheel
6 Shaft 7 Bearing device
8 Bearing housing
9 Radial bearing
10 Slinger element
11 Oil drainage channel
12 Oil delimitation chamber
13 Gas seal
14 Deflection means
15 Bearing flange
16 Collection channel
17 Wall element
18 Bearing housing wall
19 Shaft shoulder
20 Spray lug
21 Recess in the bearing flange
22 Oil drainage opening of the bearing housing
23 Oil drainage ramp
24 Oil seal
25 Step
26 Spray channel
27 Water channel
P1-P5 Arrows

The invention claimed is:

1. A turbocharger comprising:
a bearing device which is arranged between a compressor and a turbine and which is designed to support a shaft, said bearing device having a bearing housing in which an oil-lubricated bearing for supporting the shaft is arranged,
wherein the shaft has a slinger element extending in a circumferential direction for centrifugally dispersing a lubricating oil,
wherein the bearing housing has an oil drainage channel for discharging the lubricating oil from the bearing housing,
wherein an inner region of the bearing housing forms an oil delimitation chamber which is sealed off by seals arranged between the shaft and the bearing housing,
wherein the oil delimitation chamber has a deflection means, wherein the deflection means is shaped to deflect the lubricating oil that is centrifugally dispersed by the slinger element and shaped to conduct deflected lubricating oil in an opposite direction to the seals,
wherein the oil delimitation chamber is formed near the slinger element such that the lubricating oil centrifugally dispersed by the slinger element during operation of the turbocharger can be transferred straight from said slinger element to the deflection means, and
wherein the slinger element is formed such that the lubricating oil sprayed away from the slinger element has a radial directional component and an axial directional component, wherein the axial directional component runs in the opposite direction to the seals, and
wherein the bearing device further comprises a bearing flange, the bearing flange and the bearing housing defining the oil delimitation chamber, a wall element extending from the bearing flange, the wall element positioned separately from the slinger element and configured to prevent the lubricating oil from flowing back into a spray channel.

2. The turbocharger of claim 1, wherein the oil delimitation chamber is delimited towards the shaft in a portion of the shaft arranged axially alongside the slinger element by the bearing flange connected to the bearing housing wherein the oil delimitation chamber has a collection channel for intercepting the lubricating oil received from the deflection means, wherein the collection channel has at least one wall element to prevent the lubricating oil diverted by the deflection means from running back in a direction of the seals, and wherein the collection channel is formed to conduct the lubricating oil from the collection channel into the oil drainage channel when the turbocharger is operating.

3. The turbocharger of claim 1, wherein the deflection means is an integrated constituent of a wall of the bearing housing.

4. The turbocharger of claim 1, wherein the deflection means has a cone-shaped design.

5. The turbocharger of claim 1, wherein the deflection means has an arc-shaped design.

6. The turbocharger of claim 1, wherein the slinger element is a shaft shoulder.

7. The turbocharger of claim 1, wherein the slinger element is a free-standing slinger disk.

8. The turbocharger of claim 1, wherein a cross section of the oil delimitation chamber is enlarged in a region between the slinger element and the deflection means as a distance from the shaft increases.

9. The turbocharger of claim 8, wherein the enlargement of the cross section of the oil delimitation chamber in the region between the slinger element and the deflection means is formed at least in part by a recess in the bearing flange.

10. The turbocharger of claim 1, wherein the oil drainage channel has a cylindrical region near an oil drainage opening in the bearing housing and has, between the cylindrical region and the shaft, an oil drainage ramp running obliquely in a direction of the shaft, through which the oil drainage channel is widened in the direction of the shaft.

11. The turbocharger of claim 10, wherein:
in a first ramp region adjacent to the cylindrical region, the oil drainage ramp forms a first angle relative to the shaft which falls in a range between 45° and 80°; and
in a second ramp region adjacent to the first ramp region, the oil drainage ramp forms a second angle relative to the shaft which falls in a range between 30° and 45°.

12. The turbocharger of claim 10, wherein the following equation applies to a diameter of the cylindrical region of the oil drainage channel relative to a diameter of the shaft of the turbocharger:

$$F/D > 0.7,$$

where F is the diameter of the cylindrical region of the oil drainage channel and D is the diameter of the turbocharger shaft.

13. The turbocharger of claim 10, wherein the following equation applies:

$$(A+C)/D > 2.7,$$

where A is a distance of an end of the oil drainage ramp further from the oil drainage opening than the shaft, C is a distance of the end of the oil drainage ramp closer to the oil drainage opening than the shaft, and D is a diameter of the shaft.

14. The turbocharger of claim 10, wherein the following equation applies:

$$G/H < 1,$$

where G is a diameter of a trapped oil damper gap and H is an outer diameter of a radial bearing of the turbocharger.

15. The turbocharger of claim 10, wherein the following equation applies:

$$H/D < 1,$$

where H is an outer diameter of a radial bearing of the turbocharger and D is a diameter of the shaft.

16. The turbocharger of claim 10, wherein the following equation applies:

$$B/D > 0.2,$$

where B is a height of a collection chamber and D is a diameter of the shaft.

17. The turbocharger of claim 10, wherein the deflection means is a deflection cone, and wherein the following equation applies:

$$X/Z < 1,$$

where X is an angle between the shaft and the deflection cone and Z is a slinger angle of the lubricating oil from the shaft in a direction of the deflection cone.

18. The turbocharger of claim 10, wherein the deflection means is a deflection cone, and wherein the following equation applies:

$$(J + \sin(X) \cdot E)/D > 0.5,$$

where J is a distance of an end of the deflection cone close to the shaft, X is an angle between the shaft and the deflection cone, E is an axial length of the deflection cone, and D is a diameter of the shaft.

19. The turbocharger of claim 1, further comprising a screen which is arranged to shield the seals from lubricating oil spray in a region below the shaft.

20. The turbocharger of claim 1, wherein the deflection means is shaped to conduct the deflected lubricating oil in an axially opposite direction from the seals.

21. The turbocharger of claim 1, wherein the bearing flange is connected to the bearing housing and defines a collection channel sized to collect the deflected lubricant oil from the deflection means, an end region of the collection channel on a seal side is defined by the wall element.

\* \* \* \* \*